(12) United States Patent
Kambhampati et al.

(10) Patent No.: US 12,705,659 B2
(45) Date of Patent: Aug. 11, 2026

(54) SYSTEMS AND METHODS FOR ASSESSING ITEMS FOR SALE

(71) Applicant: Walmart Apollo, LLC, Bentonville, AR (US)

(72) Inventors: Prithvi Kambhampati, The Colony, TX (US); Paarvendhan Puviyarasu, Dallas, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 245 days.

(21) Appl. No.: 18/429,013

(22) Filed: Jan. 31, 2024

(65) Prior Publication Data

US 2025/0245716 A1 Jul. 31, 2025

(51) Int. Cl.

*G06Q 30/00* (2023.01)
*G06Q 10/087* (2023.01)
*G06Q 30/0601* (2023.01)
*G06T 7/62* (2017.01)
*G06T 7/73* (2017.01)
*G06V 20/50* (2022.01)

(52) U.S. Cl.

CPC ....... *G06Q 30/0627* (2013.01); *G06Q 10/087* (2013.01); *G06T 7/62* (2017.01); *G06T 7/73* (2017.01); *G06V 20/50* (2022.01); *G06T 2200/24* (2013.01); *G06T 2207/30242* (2013.01)

(58) Field of Classification Search

CPC ............. G06Q 30/0627; G06Q 10/087; G06Q 30/0629; G06T 7/62; G06T 7/73; G06T 2200/24; G06T 2207/30242; G06V 20/50

See application file for complete search history.

(56) References Cited

U.S. PATENT DOCUMENTS 9,996,818 B1 * 6/2018 Ren ...................... G06Q 10/087
10,140,725 B2 * 11/2018 Williams ............... G01B 11/02
10,713,803 B1 7/2020 Le et al.

(Continued)

FOREIGN PATENT DOCUMENTS

CN 105701519 A * 6/2016 ............ G06V 30/15

OTHER PUBLICATIONS

Ahmed, Uzair. Advancing Retail Robotics: A Vision-Based Out of Stock Detection System for Retail Scenes Without Planograms. Carnegie Mellon University, 2023. (Year: 2023).*

(Continued)

*Primary Examiner* — Matthew E Zimmerman
(74) *Attorney, Agent, or Firm* — Foley IP Law, PLLC

(57) ABSTRACT

In some embodiments, apparatuses and methods are provided herein useful to assessing items for sale. In some embodiments, there is provided a system for assessing items for sale at a retail facility including an imaging device, a database, and a control circuit. The control circuit configured to: receive a captured image of at least one of items for sale; receive, for each item in the captured image, an identification of the item for sale associated with each bounding box; map item dimensions for each identified item for sale to pixels associated with each bounding box in the captured image; determine a volume estimate corresponding to the at least one of the items for sale supported on a surface; and determine, based on at least the volume estimate and the item dimensions, a quantity of the at least one of the items for sale supported on the surface.

20 Claims, 12 Drawing Sheets

(56) References Cited

U.S. PATENT DOCUMENTS

| | | | | |
|---|---|---|---|---|
| 11,164,149 | B1 * | 11/2021 | Williams | G06K 19/06028 |
| 11,842,321 | B1 * | 12/2023 | Zou | G06V 20/52 |
| 2016/0180549 | A1 * | 6/2016 | Shekar | G06F 18/254 382/103 |
| 2018/0018788 | A1 * | 1/2018 | Olmstead | G06T 7/50 |
| 2018/0253857 | A1 | 9/2018 | Driegen et al. | |
| 2019/0149725 | A1 * | 5/2019 | Adato | H04N 1/00 348/158 |
| 2020/0098198 | A1 * | 3/2020 | Ackley | G01B 11/02 |
| 2021/0272086 | A1 * | 9/2021 | Buibas | G06T 7/251 |
| 2023/0252750 | A1 * | 8/2023 | Bjelcevic | G06V 10/12 |

OTHER PUBLICATIONS

Berry et al., “Probabilistic forecasting of heterogeneous consumer transaction-sales time series”, International Journal of Forecasting, vol. 36, Issue 2, Apr.-Jun. 2020, pp. 552-569.

* cited by examiner 412
1650 pixels=40 inches
600 pixels=
14.625 inches
410
L282
L282
L282
$19.00
310
404
402
UPC: 4900005848-Sprite
Out for sale: 20
Number of layers: 3
Fill percentage: 24.3%
406
408

600
CLUBIQ
616
IRAS BG PROCESS
612
CLUBIQ FORECAST
610
602
PREDICTIVE OOS
COSMOS DB
614
CDP
PRODUCT DIMENSIONS
606
IRAS
BOUNDINGBOX INFO
604
LOCATION MAPPING
608

FIG. 7

CLUBIQ
616
C
EH PUSHES TO COSMOS DB
EVENT HORIZON
EVERYDAY
610
FORECAST COSMOS DB
A
INVENTORY INTELLIGENCE
CALCULATES RUNOUT ESTIMATES FOR EACH ITEMNUMBER FROM THE FORECAST
702
704
B
ACCURATE OUT-FOR-SALE
PREDICTIVE OUT-OF-STOCK
D
JOB HOSTED IN AKS
602
DATA SERVICE API CALL
PROVIDES COUNT LOGIC TO DETERMINE THE REAL LOCATION OF AN UPC
712
LOCATION MAPPING SQL DB

C

710
EVENT HORIZON
612
IRAS BACKGROUND PROCESS
SEND TO EH AND UPDATE SENT FLAG
PREVENTS SENDING SAME ITEMNUMBERS FOR SAME CLUB ON SAME DAY
UPDATE FLAG IF RESULTS SUCCESFULLY SENT TO EH
716
SERVICE BUS WITH DEDUPLICATION
614
POOS RESULTS COSMOS DB
D
STORE ALL P-OOS RESULTS IN DB

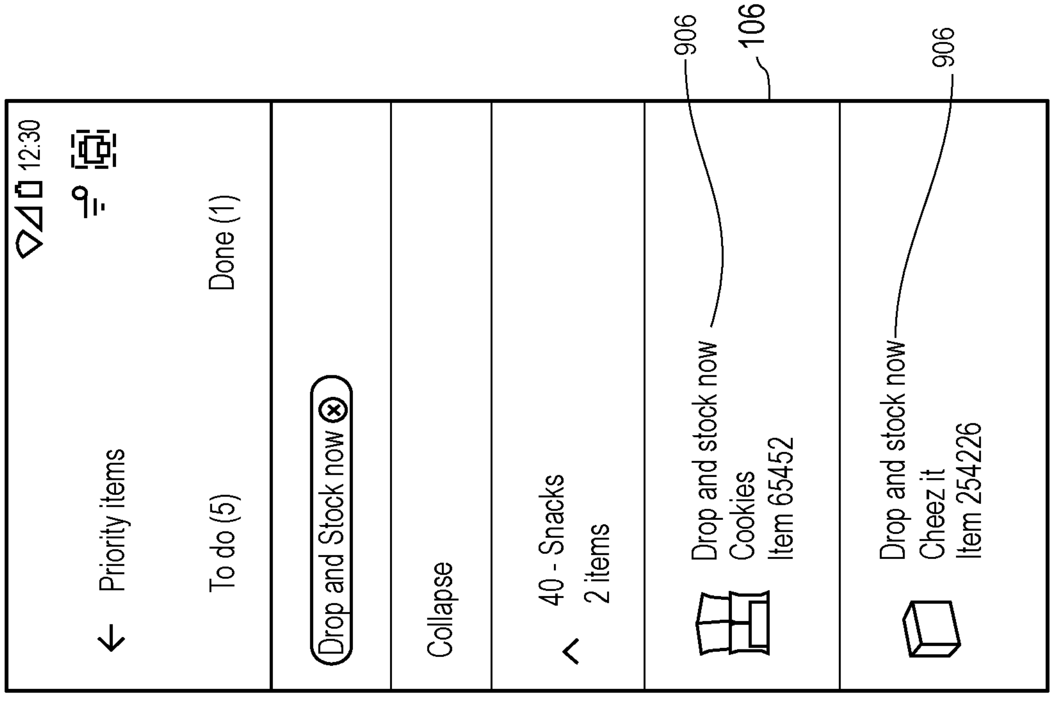
FIG. 9
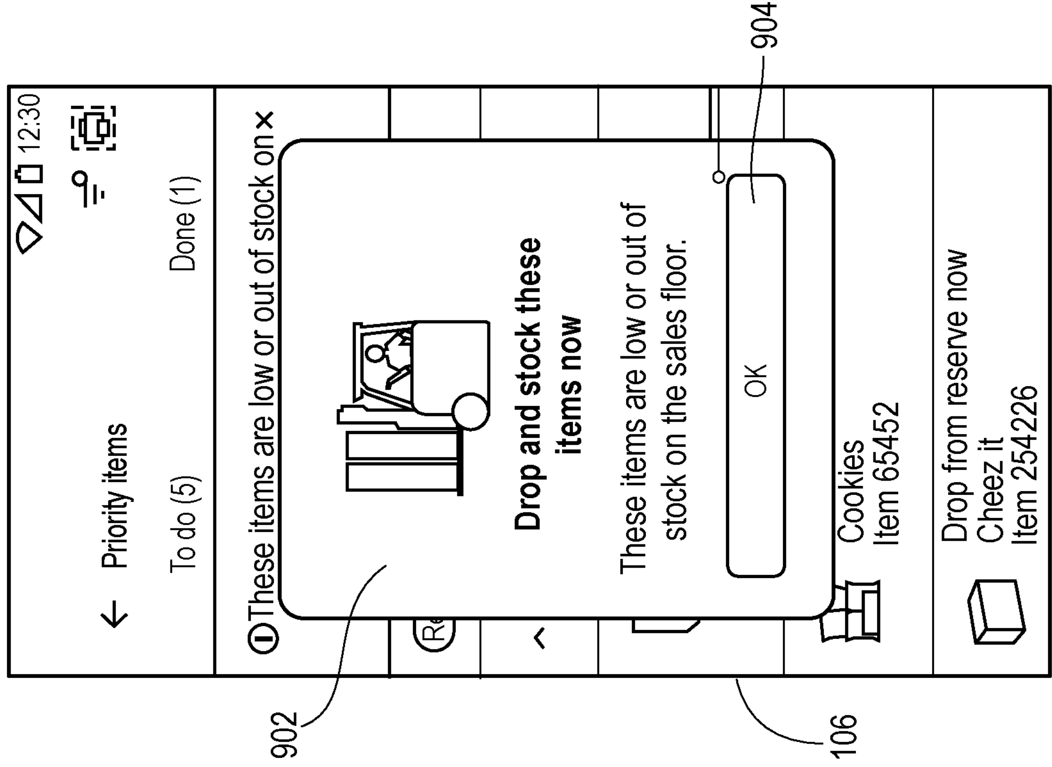

SYSTEMS AND METHODS FOR ASSESSING ITEMS FOR SALE

TECHNICAL FIELD

This invention relates generally to assessing items for sale, and more specifically to assessing a number of items for sale at a facility.

BACKGROUND

In a retail store where customers select and collect items for purchase, it is intended that shelves and product displays have a sufficient quantity of items for sale, with extra stock of items being stored in stock areas of the store that are not accessible to customers. In some cases, inventory systems may indicate the number of items that are supposed to be at the store, but it can be difficult to determine how many of those items are located in the areas of the store that are accessible by customers and relative to the number of items in the stock areas of the store.

BRIEF DESCRIPTION OF DRAWINGS

Disclosed herein are embodiments of systems, apparatuses and methods pertaining to assessing items for sale at a retail facility. This description includes drawings, wherein:

FIG. 9 shows example illustrations of a user interface in accordance with some embodiments.

Figure 1:
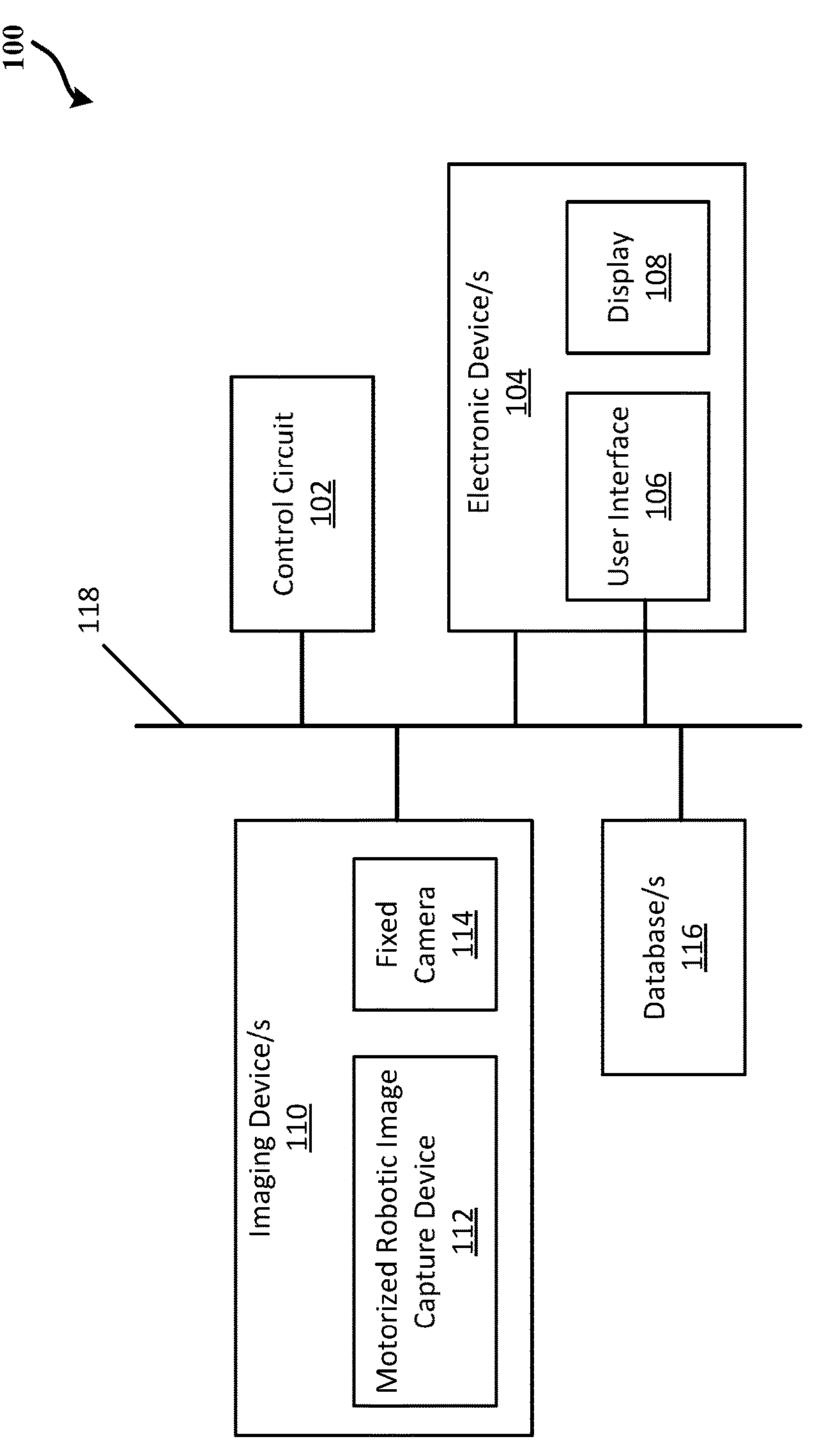
FIG. 1 illustrates a simplified block diagram of an exemplary system for assessing items for sale at a retail facility in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for assessing items for sale at a retail facility. In some embodiments, a system for assessing items for sale at a retail facility includes an imaging device configured to capture images of the items for sale at the retail facility. Alternatively or in addition, the system may include a database storing data corresponding to the items for sale at the retail facility. The data may include item dimensions for each of the items for sale and surface dimensions of surfaces that support and display the items for sale at the retail facility. Alternatively or in addition, the system may include a control circuit coupled to the database. In some embodiments, the control circuit receives a captured image of at least one of the items for sale. In some embodiments, the at least one of the items for sale positioned on a surface at a location in the retail facility accessible by customers and where the customers can collect the items for purchase. In some embodiments, the captured image includes a bounding box indicating each of the at least one of the items for sale. Alternatively or in addition, the control circuit may receive, for each item in the captured image, an identification of the item for sale associated with each bounding box. Alternatively or in addition, the control circuit may map the item dimensions for each identified item for sale to pixels associated with each bounding box in the captured image. Alternatively or in addition, the control circuit may determine, using at least a pixel count associated with each bounding box and corresponding surface dimensions of the surface, a volume estimate corresponding to the at least one of the items for sale supported on the surface. Alternatively or in addition, the control circuit may determine, based on at least the volume estimate and the item dimensions, a quantity of the at least one of the items for sale supported on the surface.

In some embodiments, a method for assessing items for sale at a retail facility includes receiving, by a control circuit coupled to a database storing data corresponding to the items for sale at the retail facility, a captured image of at least one of the items for sale positioned on a surface at a location in the retail facility accessible by customers and where the customers can collect the items for purchase. The captured image may be captured by an imaging device configured to capture images of the items for sale at the retail facility. In some embodiments, the captured image includes a bounding box indicating each of the at least one of the items for sale. In some embodiments, the stored data corresponding to the items for sale may include item dimensions for each of the items for sale and surface dimensions of surfaces that support and display the items for sale at the retail facility. Alternatively or in addition, the method may include receiving by the control circuit and for each item in the captured image, an identification of the item for sale associated with each bounding box. Alternatively or in addition, the method may include mapping, by the control circuit, the item dimensions for each identified item for sale to pixels associated with each bounding box in the captured image.

Alternatively or in addition, the method may include determining, by the control circuit and using at least a pixel count associated with each bounding box and corresponding surface dimensions of the surface, a volume estimate corresponding to the at least one of the items for sale supported on the surface. Alternatively or in addition, the method may include determining, by the control circuit and based on at least the volume estimate and the item dimensions, a quantity of the at least one of the items for sale supported on the surface.

Embodiments described herein are for assessing items for sale at a retail facility, such as a number of items for sale, and/or a number of specific items for sale in the retail facility. In some embodiments, the assessed items for sale may be used to estimate where, when, and/or which items may be low on the sales floor space or may run out in order to prompt workers to replenish the items. For example, the number of items that are generally in the facility may be known using an inventory system. However, it can be difficult to determine what items and/or the number of items that are present on the sale floor in locations accessible by customers such that a customer can collect an item for purchase versus the items that are located in the back room, stock room, and receiving areas where customers are not able to pick an item to purchase. In some embodiments, the number of items on the sales floor accessible to customers is referred to as the items that are "out for sale". Thus, in assessing the items for sale, a number of quantity of items out for sale is determined. And in some embodiments, the quantity of individual items is determined, e.g., the quantity of items of product A that is out for sale is determined, the quantity of items of product B that is out for sale is determined, and so on. In some embodiments, once the quantity of items out for sale is determined, the timing of when to replenish the items can be estimated (e.g., based on actual and/or predicted sales velocity) and/or a message is sent that the product corresponding to the items need repleshing.

Figure 2:
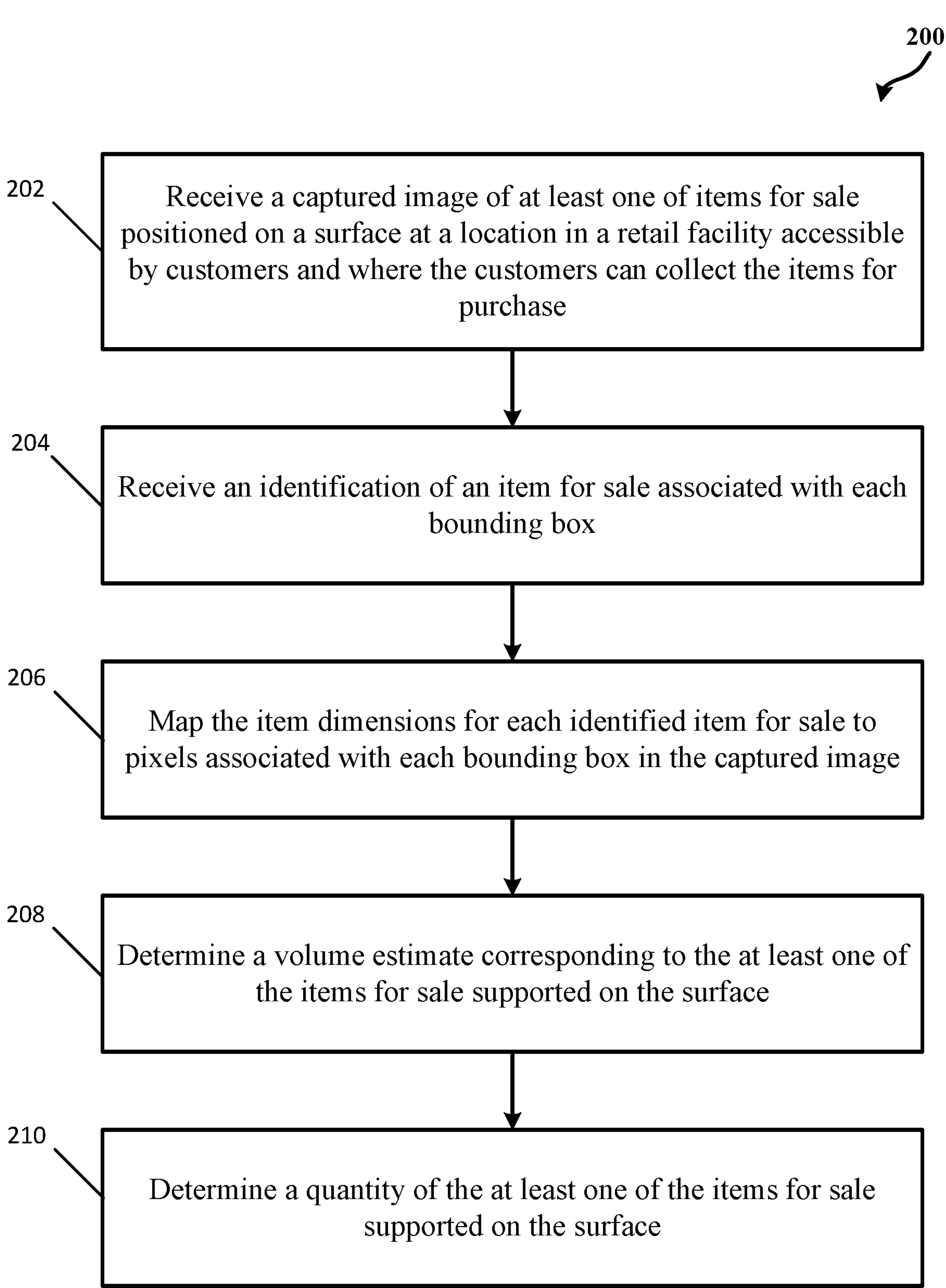
FIG. 2 shows a flow diagram of an exemplary method of assessing items for sale at a retail facility in accordance with some embodiments.

FIG. 1 illustrates a simplified block diagram of an exemplary system 100 for assessing items for sale at a retail facility in accordance with some embodiments. FIG. 2 shows a flow diagram of an exemplary method 200 of assessing items for sale at a retail facility in accordance with some embodiments. In some embodiments, the system 100 includes one or more imaging devices 110 capturing images of items for sale at a retail facility. An imaging device 110 may include at least one of a motorized robotic image capture device 112, a fixed camera 114, and even a mobile camera (not shown), such as carried by a worker. Alternatively or in addition, the system 100 may include one or more databases 116 storing data corresponding to the items for sale at the retail facility. The data may include typical inventory data such as item quantity, price, etc. In some embodiments, the data may include item dimensions for each of the items for sale and surface dimensions of surfaces that support and display the items for sale at the retail facility. For example, item dimensions and/or surface dimensions may include width, height, depth, and/or length. In another example, a surface that at least one of the items for sale is placed or positioned on may include a surface of a pallet or a surface of a shelf. In some embodiments, the one or more databases 116 may include one or more storage memories or devices (e.g. hard disk, solid state drive, optical storage devices, to name a few), storage systems, cloud and virtual storage, and/or any type of computing hardware capable of storing, porting, and/or extracting electronic data files and objects.

Figure 3:
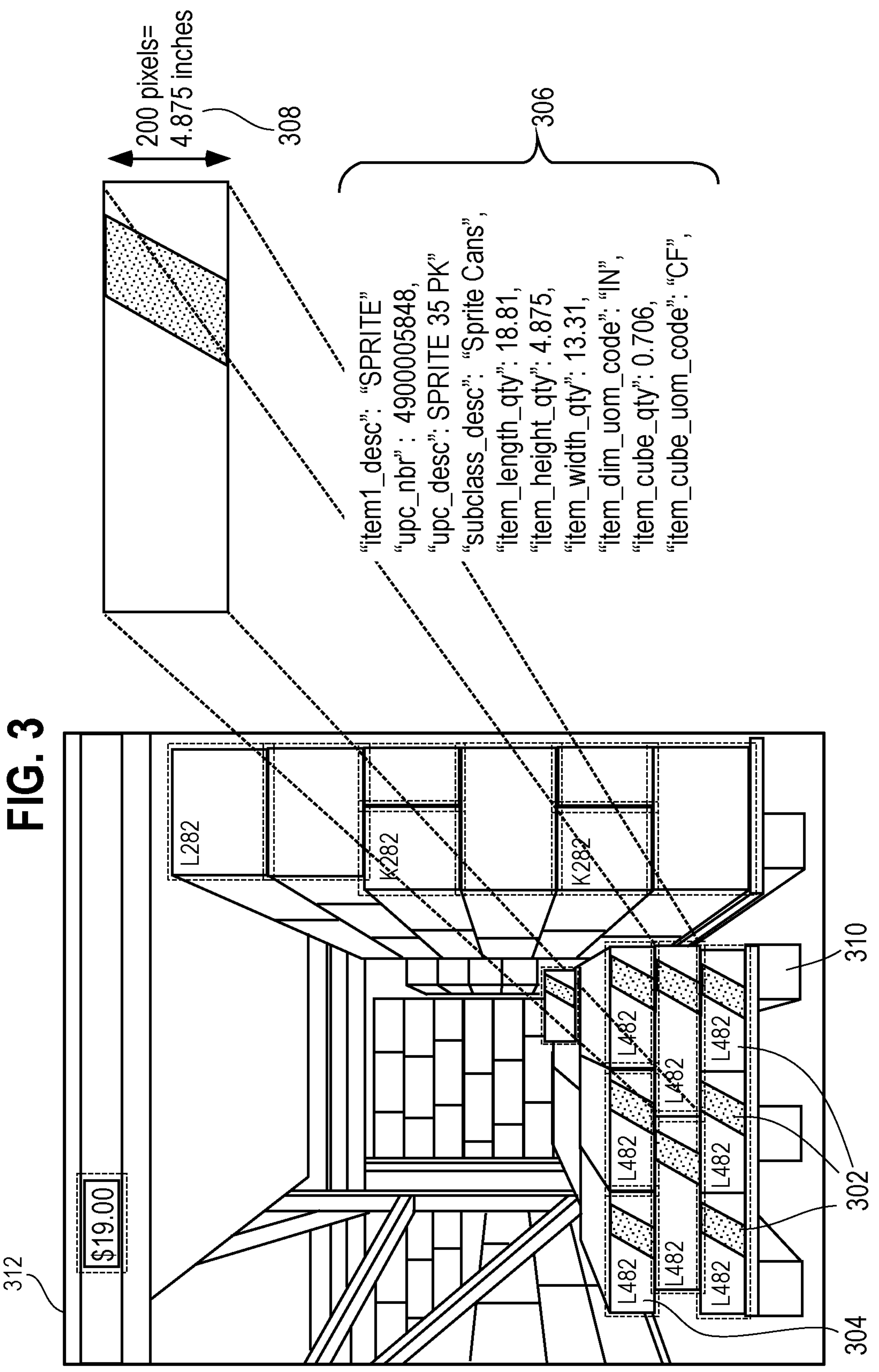
FIG. 3 shows an illustrative depiction of mapping item dimensions to image pixels associated with bounding boxes in captured images of items for sale in accordance with some embodiments.

Alternatively or in addition, the system 100 may include a control circuit 102 that may be coupled to one or more databases 116 via a communication network 118. In some embodiments, the communication network 118 may include wired and/or wireless network, WIFI, Internet, local area network (LAN), and/or any communication network capable of coupling one electronic device and/or component to another electronic devices and/or components. In some embodiments, at step 202, the control circuit 102 receives a captured image of at least one of items for sale as obtained by an imaging device. In some embodiments, the at least one of the items for sale is positioned on (or hung or suspended from) a surface at a location in a retail facility accessible by customers and where the customers can collect the items for purchase. In some embodiments, the captured image includes one or more bounding boxes 302 such as shown in FIG. 3 indicating each of the at least one of the items for sale. While referring to FIGS. 1 and 2, concurrent reference will be made to FIG. 3. In an illustrative non-limiting example, FIG. 3 shows an illustrative depiction of mapping item dimensions to image pixels associated with the bounding boxes 302 in the captured image in accordance with some embodiments. For example, the captured image shown in FIG. 3 depicts a number of bounding boxes 302. Each of the bounding boxes 302 is associated with an identification 304 of an item. For example, each item highlighted by the bounding box 302 in FIG. 3 is associated with item L482. Item L482 in the database 116 is associated with a case of a particular canned soda. In some embodiments, the identification 304 may be associated in the database 116 with a plurality of item data 306. The item data 306 may include one or more of item description, UPC number, UPC description, subclass description, item dimensions (e.g., length, height, width, depth), unit of the item dimensions, volume of the item (e.g., item_cube_qty), and/or unit of the volume (e.g., cubic feet CF), to name a few.

In an illustrative non-limiting example, at step 204, the control circuit 102 may receive, for each item in the captured image, an identification 304 of the item for sale associated with each bounding box 302. Alternatively or in addition, at step 206, the control circuit 102 may map the item dimensions for each identified item for sale to pixels associated with each bounding box 302 in the captured image. For example, at 308, the control circuit 102 has mapped the height of the item L482 to 200 pixels.

In some embodiments, the control circuit 102 may estimate the height of an item L482 using one or more surrounding objects with fixed dimensions. For example, the control circuit 102 may use the surface 310 (e.g., a wooden pallet) as a reference object. The control circuit 102 may obtain the surface's 310 fixed dimensions stored in one of the database/s 116. By one approach, the surface's 310 dimensions may be an industry standard. In an illustrative non-limiting example, a computer vision model (e.g., a computer vision model used by the IRAS module 718 of FIG. 7) may detect in the captured image a surface 310 and determine the stored dimensions of the detected surface 310. The control circuit 102 may receive at least the height of the detected surface 310. In some embodiments, the control circuit 102 may receive at least the height from the computer vision model and/or accessed the height (or stored dimensions of the detected surface 310) from one of the database/s 116. For example, the computer vision model detects a wooden pallet in a captured image by overlaying a bounding box on the wooden pallet. The control circuit 102 may receive the captured image and obtain the height of the wooden pallet bounding box in pixels from the captured image. The control circuit 102 may then map that pixels to the height of the wooden pallet. To illustrate, if the height of the wooden pallet bounding box is 50 pixels, then 50 pixels is equated to 5.75 inches since the stored dimensions of the wooden pallet is 40" width×48" depth×5.75" height. If the total height of the items or the bounding boxes of the items on the wooden pallet is 500 pixels, the control circuit 102 may then estimate that the total height of the stacked items on the wooden pallet is 57.5 inches (500 pixels divided by 50 pixels, then multiply by 5.75 inches equals 57.5 inches).

Alternatively or in addition, at step 208, the control circuit 102 may determine, using at least a pixel count associated with each bounding box 302 and corresponding surface dimensions of a surface 310 where the at least one of the items is position on, a volume estimate corresponding to the at least one of the items for sale supported on the surface 310. For example, in FIG. 3, the surface 310 is a surface of a pallet. In some embodiments, the volume estimate may include an estimate of a total volume of the items for sale supported on the surface 310. Alternatively or in addition, at step 210, the control circuit 102 may determine, based on at least the volume estimate and the item dimensions, a quantity 402 of the at least one of the items for sale supported on the surface 310.

Figure 4:
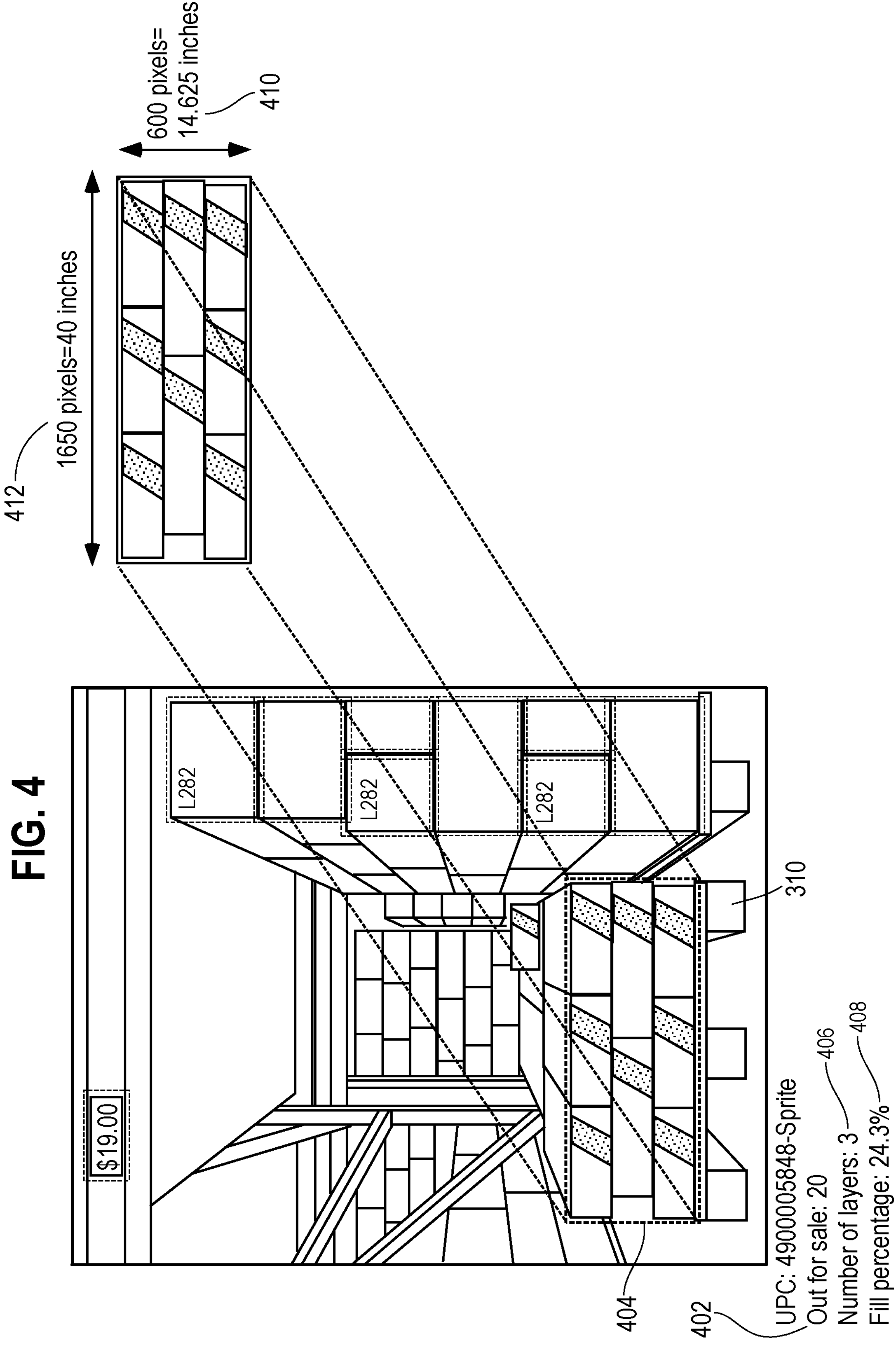
FIG. 4 shows an illustrative depiction of an area of an aggregation of bounding boxes in accordance with some embodiments.

In an illustrative non-limiting example, FIG. 4 shows an illustrative depiction of an area 404 of an aggregated bounding boxes 302 in accordance with some embodiments. For example, the quantity 402 of the at least one of the items for sale supported on the surface 310, a calculated number of layers 406, and a fill value 408 are shown in FIG. 4. In some embodiments, the control circuit 102 may determine the at least one of the items for sale includes a stack of products and a number of layers 406 of the stack based on the area 404 of an aggregated bounding boxes 302 in the captured image and the item dimensions of the identified item. In some embodiments, the control circuit 102 may determine a fill value 408 associated with the surface 310 based at least on the quantity 402 of the at least one of the items for sale supported on the surface 310. For example, in FIG. 4 at 410 and 412, the height of the area 404 of the aggregated bounding boxes 302 corresponds to 14.625 inches which corresponds to 600 pixels while the width of the area 404 corresponds to 40 inches which corresponds to 1650 pixels. Moreover, in FIG. 4, the fill value 408 corresponds to 24.3 percent while the number of layers 406 corresponds to 3 (e.g., at 410 and 308, respectively, 600 pixels divided by 200 pixels equals 3 layers).

In some embodiments, the control circuit 102 may determine a fill value 408 based on a total quantity of items that can be stacked on a particular surface 310 and an estimated quantity of items for sale supported on the particular surface 310 in the captured image. For example, the control circuit 102 may access one of the database/s 116 to obtain the total quantity of items that can be stacked on the surface 310 depicted on the captured image. In some embodiments, the total quantity of items may be retrieved from planogram data stored in one of the database/s 116. The control circuit 102 may estimate the quantity of items for sale supported on the surface 310 in the captured image. To determine a fill value 408, the control circuit 102 may then take a ratio of the estimated quantity of items depicted on the captured image with the total quantity of items that can be stacked on the surface 310 of the captured image. In an illustrative non-limiting example, in FIG. 4, the estimated quantity of items corresponds to 20 out for sale items with 24.3% fill percentage based on the total quantity of items that can be stacked on the surface 310 being 82 items.

In some embodiments, the control circuit 102 determines an area (e.g., the area 404 of the front surfaces of the items of FIG. 4) of an aggregated bounding boxes 302 in the captured image based on the mapping of the item dimensions for each identified item for sale to the pixels associated with each bounding box 302. Alternatively or in addition, the control circuit 102 determines an orientation of the surface 310 based on the area 404 of the aggregated bounding boxes 302. In some embodiments, the determination of the volume estimate may be based on the area 404 of the aggregated bounding boxes 302, the orientation of the surface 310, and the corresponding surface dimensions of the surface 310. Alternatively or in addition, the control circuit 102 may access the database 116 to determine surface dimensions of the surface 310.

In an illustrative non-limiting example, in FIG. 4, the surface dimensions of the surface 310 may include 40 inches width and 48 inches depth. In some embodiments, the control circuit 102 may access the database 116 to obtain the surface dimensions of the surface 310. By one approach, the surface dimensions of the surfaces 310 used in the retail facility are the same. By another approach, the control circuit 102 may determine which one of the stored surface dimensions of the surfaces 310 to obtain from the database 116 based on the location the captured image was taken. In some embodiments, the control circuit 102 may determine that the width associated with the area 404 is the same as the width of the surface 310. In such embodiments, the control circuit 102 determines the volume estimate corresponding to the at least one of the items for sale supported on the surface 310 by multiplying the area 404 with the depth of the surface 310. In some embodiments, the control circuit 102 may divide the volume estimate by the calculated volume or stored volume associated with the item dimensions of an item for sale to determine the quantity of the at least one of the items for sale supported on the surface 310. For example, in FIG. 4, the area 404 may correspond to 585 square inches (e.g., 40 inches multiply by 14.625 inches). In some embodiments, the stored volume associated with item dimensions of an item associated with a bounding box 302 corresponds to 1404 cubic inches. In such embodiments, the quantity of items out for sale 402 may correspond to 20 items (e.g., 585 square inches multiply by 48 inches, then divided by 1404 cubic inches).

In some embodiments, if the top layer of the items stacked on the surface 310 is partially filled (such that the items on the top layer are placed towards closer to one of the edge-depth side of the top layer (e.g., to the right side or left side)), the control circuit 102 may adjust the quantity of items out for sale 402 that was determined above based on the number of missing items in the top layer. For example, in determining the area 404 for a partially filled top layer, the control circuit 102 may use a vertical side of the stacked items that is higher relative to the other vertical side of the stacked items. The resulting area 404 may be used to determine an estimated quantity of items supported on the surface 310. In some embodiments, the control circuit 102 may determine the total depth of the items on the top layer based on the bounding boxes on the top layer. To determine an estimated area occupied by the items on the top layer, the determined total depth of the items on the top layer may be multiplied with the stored height of a single item and the stored depth of the surface 310. In some embodiments, the control circuit 102 may determine the total area of the top layer by multiplying the stored height of a single item with the stored width and stored depth of the surface 310. In some embodiments, the control circuit 102 may determine the total area of the "missing" items on the top layer by subtracting the estimated area occupied by the items on the top layer from the total area of the top layer. In some embodiments, the control circuit 102 may determine the quantity of items out for sale 402 supported on the surface 310 by subtracting the total area of the "missing" items on the top layer from the estimated quantity of items supported on the surface 310.

Figure 5:
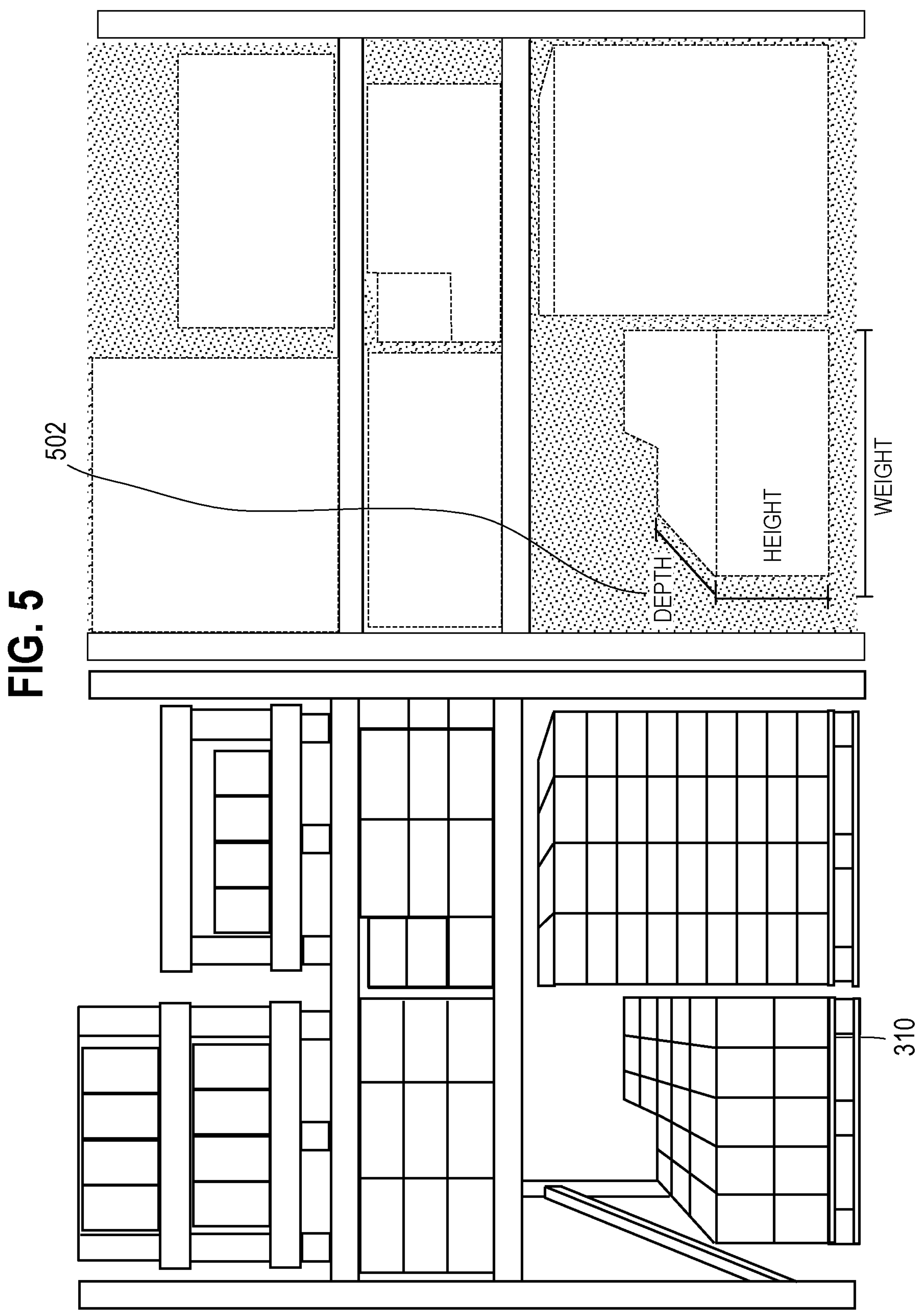
FIG. 5 shows an illustrative depiction of depth model for volume estimation in accordance with some embodiments.

FIG. 5 shows an illustrative depiction of depth model for volume estimation in accordance with some embodiments. In some embodiments, the control circuit 102 may execute a trained machine learning depth model to estimate the depth of a given product to the get the size and volume of the surface 310 (e.g., a pallet). For example, the trained machine learning depth model may estimate the depth 502 of the surface 310 without having to access the database 116 for surface dimensions of the surface 310. Alternatively or in addition, the trained machine learning depth model may be executed by the control circuit 102 to determine a volume estimate corresponding to the at least one of the items for sale supported on the surface 310. For example, the trained machine learning depth model may facilitate in calculating the full volume of any given surface 310 and allows the control circuit 102 to make accurate estimations of the volume estimate corresponding to the at least one of the items for sale supported on the surface. In some embodiments, the control circuit 102 may execute the trained machine learning depth model to confirm and/or verify the accuracy of the determined or calculated volume estimate described in previous paragraphs. In some embodiments, the trained machine learning depth model may include a machine learning algorithm that was trained with captured images of a plurality of retail facilities associated with a retailer. In some embodiments, the trained machine learning depth model may include supervised, semi-supervised, unsupervised, reinforcement machine learning algorithms, and/or any publicly known machine learning algorithms capable of estimating the depth of a given product to get the size and volume of a surface 310.

Figure 6:
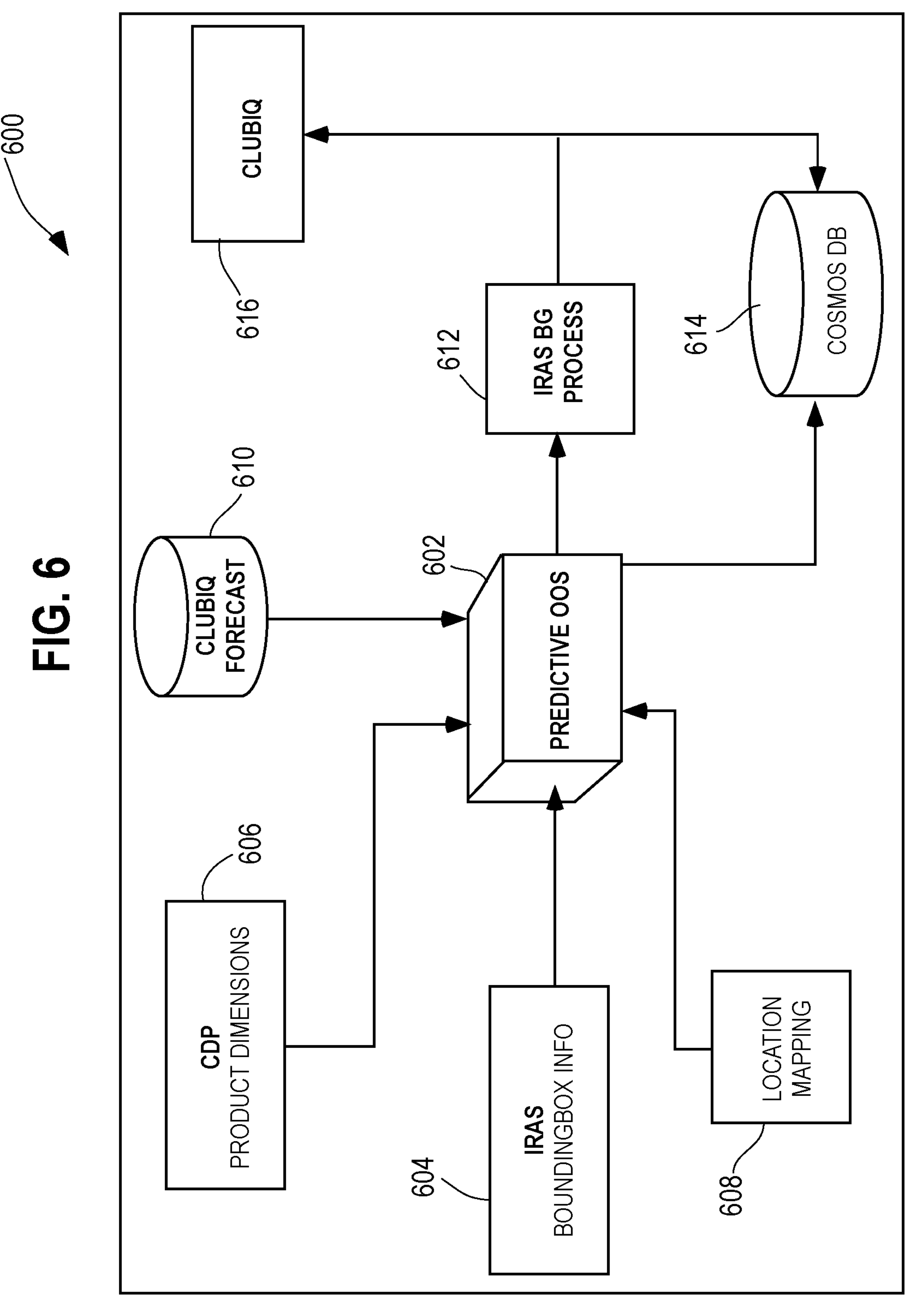
FIG. 6 illustrates a simplified architectural block diagram of an exemplary system for assessing items for sale at a retail facility in accordance with some embodiments.

FIG. 6 illustrates a simplified architectural block diagram of an exemplary system 600 for assessing items for sale at a retail facility in accordance with some embodiments. FIG. 9 shows example illustrations of a user interface 106 in accordance with some embodiments. In some embodiments, the Predictive Out-of-Sale (POOS) module 602 has multiple inputs and uses additional data sources from various external servers and systems. In some embodiments, the POOS module 602 may include the control circuit 102 and/or the system 100 of FIG. 1. In some embodiments, the POOS module 602 may cause calculation of the Accurate Out-for-Sale (AOFS) by the control circuit 102 on previous stage using the IRAS bounding box information 604 and the Common Data Platform (CDP) product dimensions 606 and uses the ClubIQ forecast 610 information that provides the forecast of sale quantity for each of day for the next four days. In some embodiments, after the POOS values for each of the items are calculated, the POOS values are evaluated and determined by the control circuit 102 to send to associates based on a multitude of business logics. In some embodiments, processes associated with the POOS module 602 may be executed by the control circuit 102. In some embodiments, processes associated with the CDP product dimensions 606, the ClubIQ forecast 610, the ClubIQ process 616, the IRAS BG process 612, the location mapping process 608, and the IRAS Boundingbox Info 604, and/or the POOS module 602 may be executed by the control circuit 102 and/or one or more control circuits (not shown).

It is noted that in some embodiments, the term IRAS (Image Recognition as a Service) as used herein is a specific service that provides product recognitions from imagery of the products. Generally, a service or function may be provided that performs item/product detection, identification, and recognition using a trained machine learning model and/or by visually recognizing product codes, labels, branding, etc. from images of products. In some embodiments, the IRAS BG process 612 may be a background process that streams the results to a user interface 106. In some embodiments, the user interface 106 may include an associate/worker facing mobile application. In some embodiments, the Cosmos DB 614 may include a data storage system that stores the results generated for future analysis and improvements.

For example, the system 100 may include a user interface 106 operable on an electronic device 104 associated with a worker at a retail facility. In some embodiments, the user interface 106 displays a message 902 of FIG. 9 including at least one of an instruction to the worker to restock the surface 310 or an estimated run out time of the at least one of the items based on the determined quantity of the at least one of the items for sale supported on the surface 310. To illustrate, the message 902 may pop-up on the user interface 106 of an electronic device 104 used by a worker. The worker may click on the "OK" button 904 causing the user interface 106 to add an alert message 906 proximate to each of Items 65452 and 254226 indicating "Drop and stock now". In some embodiments, the control circuit 102 determines the estimated run out time of the at least one of the items and prioritize transmission of the message 902 based on a plurality of estimated run out time determined for the items for sale at the retail facility. For example, the estimated run out times for product B and product C are in two days and in a week, respectively. In such example, the control circuit 102 may cause the user interface 106 to display a message 902 indicating that product B is estimated to run out in two days. In some embodiments, the control circuit 102 may subsequently cause the user interface 106 to display a subsequent message 902 indicating that product C is estimated to run out in a week.

Figure 7:
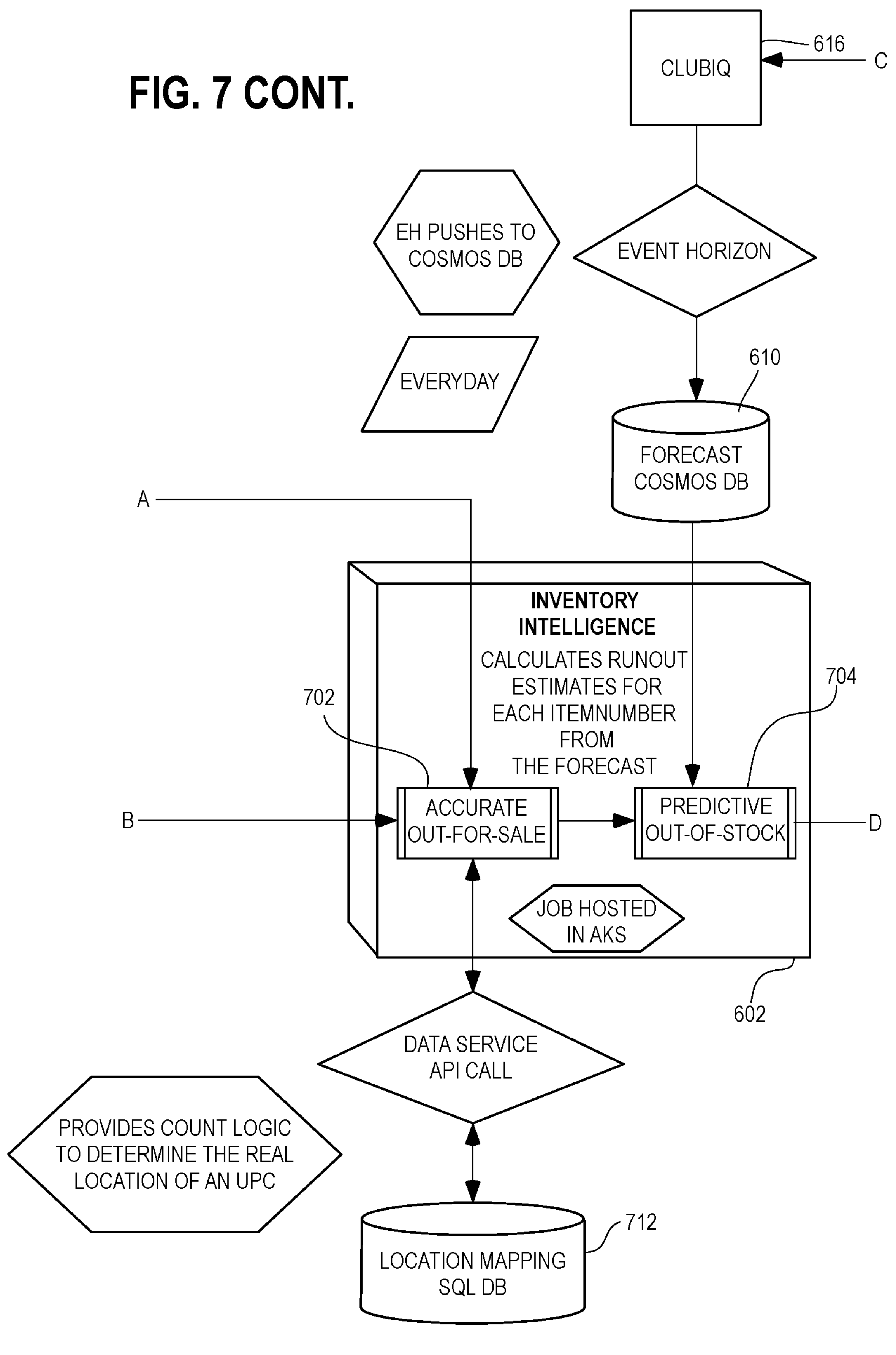
FIG. 7 shows a flow diagram of the exemplary system in FIG. 6 in accordance with some embodiments.
Figure 7:
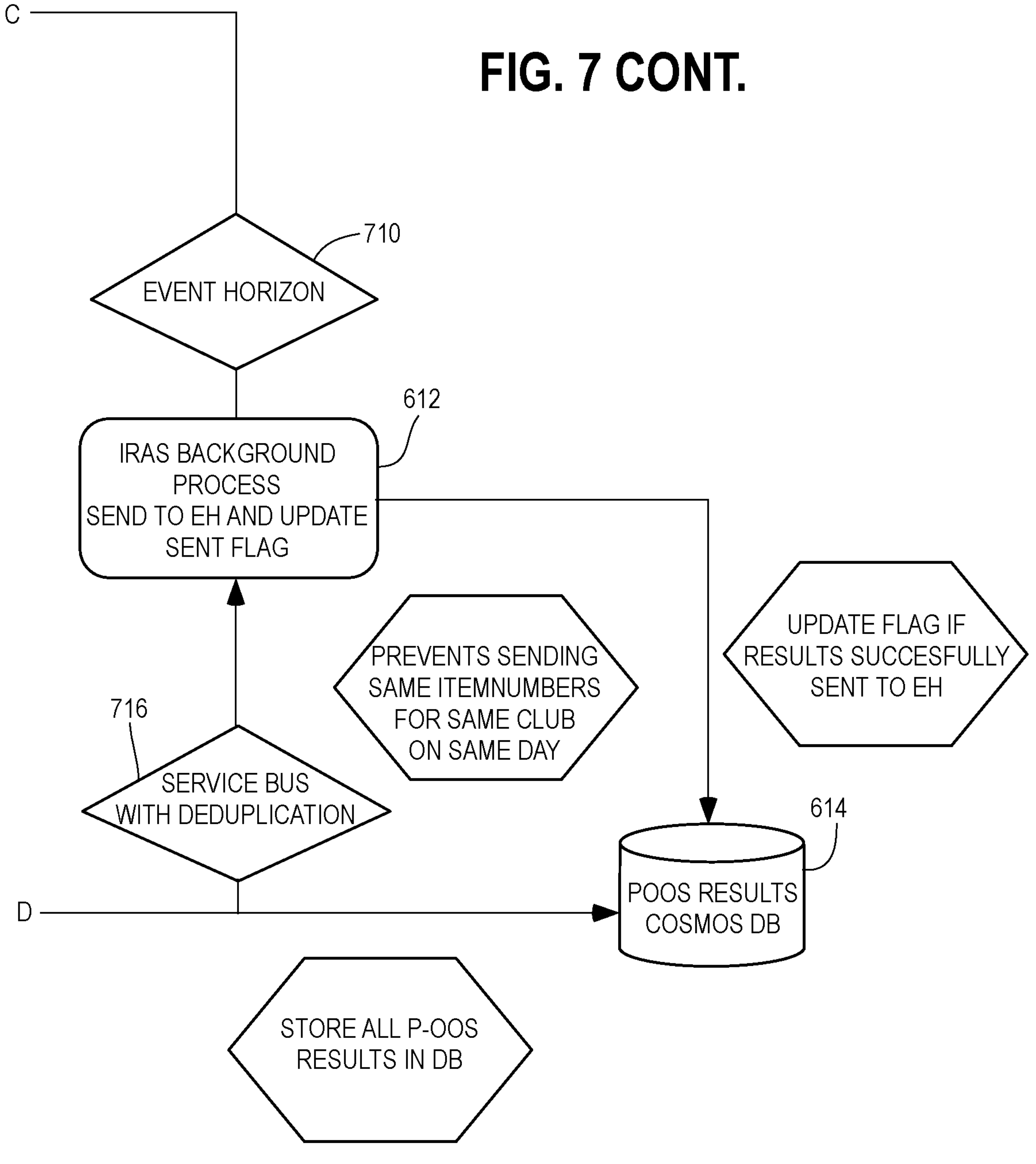

FIG. 7 shows a flow diagram 700 of the exemplary system 600 in FIG. 6 in accordance with some embodiments. For example, the POOS module 602 may include Accurate Out-for-Sale (AOFS) process 702 and/or Predictive Out-of-Stock (POOS) process 704. In some embodiments, the AOFS process 702 include obtaining the item dimensions from Cosmos Database (DB) 706. In some embodiments, the AOFS process 702 receives a plurality of captured images of items for sale at a plurality of retail facilities. The items for sale may be supported on surfaces 310. For example, the surfaces 310 may include pallets, shelves, and/or any surfaces capable of supporting items for sale at retail facilities. In some embodiments, the captured images may have been captured by one or more motorized robotic image capture devices 112. For example, a motorized robotic image capture device 112 may be capturing images of items for sale supported on surfaces 310 along an aisle and/or a sales floor area as it move up and/or down the aisle and/or toward another aisle or sales floor area. In some embodiments, the items identified in the captured images by the processes executed in the IRAS Boundingbox Info module 604 are stored and/or cataloged along their corresponding item dimensions in the Cosmos DB 614.

In an illustrative, non-limiting example, the CDP database 720 of FIG. 7 may have over 100 million records for product dimensions and/or over a 7 million unique items and/or universal product code (UPC) 722 for items for sale in one or more retail stores and/or retailers. In some embodiments, the IRAS catalog 50K UPC list or file 726 has a list of items sold and/or items for sale in the one or more retail stores and/or retailers. In some embodiments, the IRAS catalog 50K UPC list or file 726 only includes items sold or for sale at a particular retailer and/or a particular retail store; thereby, enabling the control circuit 102 to efficiently determine, obtain, and/or retrieve any data of a particular item and/or a number of items in performing any of its functions described herein. In some embodiments, the Databricks job/process 724 checks the items list from the IRAS catalog 50K UPC list/file 726 and gets the product dimension information from CDP database 720 for only the items in the IRAS catalog 50K UPC list/file 726. In some embodiments, the one or more database/s 116 may include the plurality of databases described herein.

In some embodiments, the IRAS Boundingbox Info module 604 may include IRAS Payload process 708. In some embodiments, the IRAS Boundingbox Info module 604 may be executed by a separate control function that performs item/product detection, identification, and recognition using trained machine learning model and/or recognizing product codes, labels, branding, etc., (e.g., Image Recognition as a Service (IRAS) module 718). In some embodiments, the IRAS module 718 may be configured to process a plurality of raw images taken at the retail facility and output images, such as the captured image 314 of FIG. 3, along with corresponding item data 306. In some embodiments, the IRAS Payload process 708 may include receiving the captured images and processing the captured images by identifying the items depicted in each image via overlaying the identified item with a bounding box 302. The IRAS Payload process 708 may include recognizing the item identifier (e.g., UPC code) associated with the identified item. In some embodiments, the IRAS Payload process 708 may include, in recognizing the identified item, associating the bounding box 302 with an identification 304. In some embodiments, the IRAS Payload process 708 may include outputting a captured image including one or more bounding boxes 302 indicating items for sale to the AOFS process 702. Alternatively or in addition, the AOFS process 702 may include determining a location of the items for sale depicted on a captured image by accessing a Location Mapping SQL Database 712 via API Call 714 (e.g., data service API call). In some embodiments, the location mapping process 608 may cause the Location Mapping SQL Database 712 to store associations of items for sale at each retail facility with a location in the retail facility. Alternatively or in addition, the AOFS process 702 may include determining, based on at least a volume estimate and item dimensions, a quantity of the items for sale supported on a surface 310 shown in the captured image.

Alternatively or in addition, the AOFS process 702 may include outputting the determined quantity of the items for sale to the POOS process 704. In some embodiments, the POOS process 704 includes determining, by a control circuit 102, an estimated run out time of the items for sale. Alternatively or in addition, the POOS module 602 may include prioritizing transmission of a message 902 based on a plurality of estimated run out time determined for the items for sale at the retail facility. Alternatively or in addition, the POOS module 602 may include causing the display of the message 902 by a user interface 106 operable on an electronic device 104. For example, the message 902 may include at least one of an instruction to the worker to restock the items supported on the surface 310 or an estimated run out time of the items for sale based on the determined quantity of the items for sale supported on the surface 310. In some embodiments, the POOS module 602 may include causing the Cosmos DB 614 to store the estimated run out time of the items for sale. In some embodiments, the POOS module 602 may include triggering the IRAS BG Process 612 to output the estimated run out time of the items for sale to Event Horizon process 710 and to update an associated flag stored in the Cosmos DB 614 indicating that the estimated run out time of the items for sale is sent to the Event Horizon process 710. The ClubIQ process 616 may include generating forecast data of a retail facility based on a plurality of estimated run out times of items for sale in the retail facility. By one approach, the Service Bus With Deduplication process 716 may prevent sending the same item numbers for the same club on the same day. In some embodiments, the POOS module 602 may receive the generated forecast data of the retail facility. Alternatively or in addition, the generated forecast data may be used in part by the POOS process 704 to determine an estimate run out time of items for sale.

Figure 8:
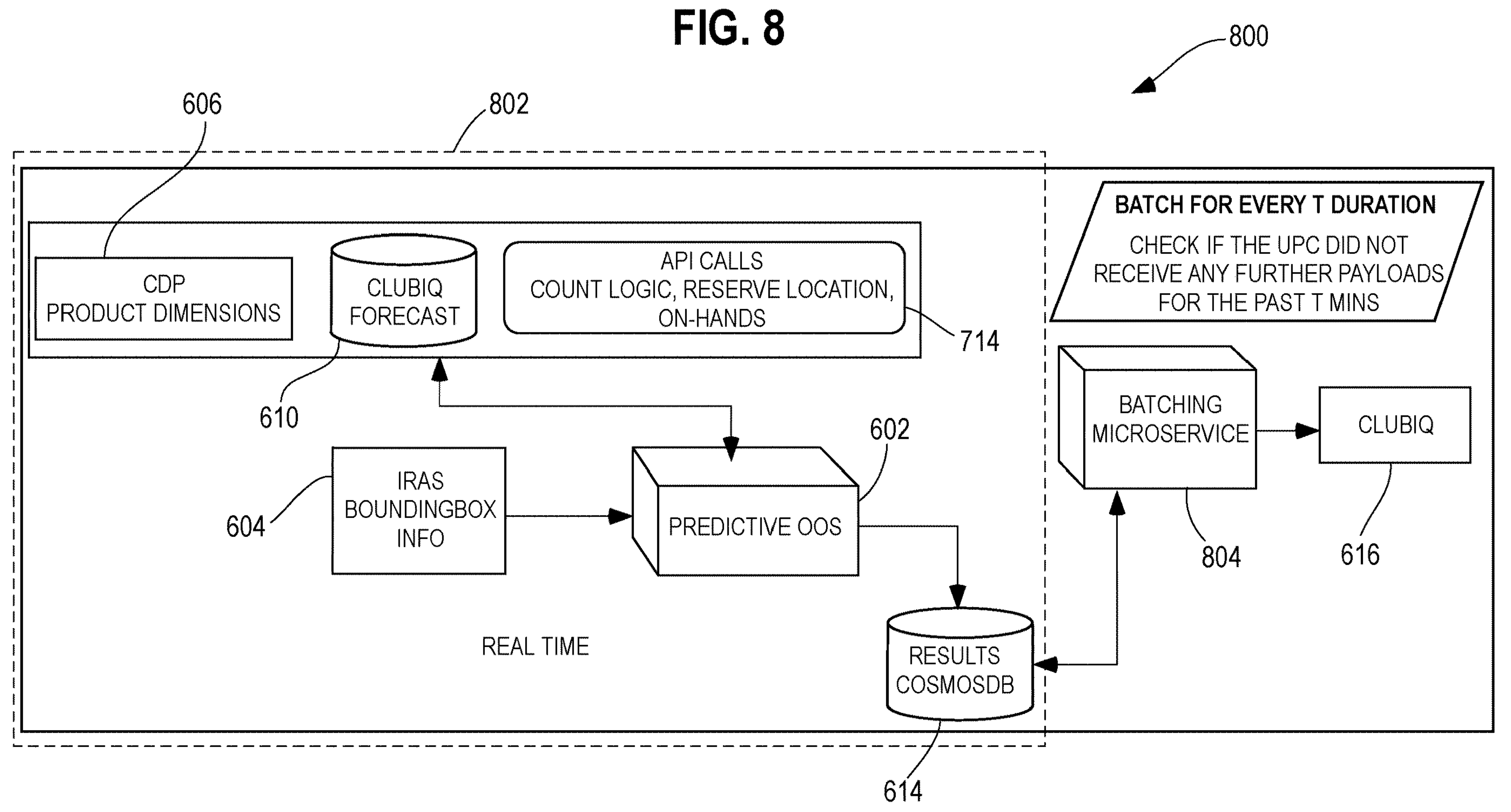
FIG. 8 illustrates a simplified architectural block diagram of an exemplary system for assessing items for sale at a retail facility in accordance with some embodiments.

FIG. 8 illustrates a simplified architectural block diagram of an exemplary system 800 for assessing items for sale at a retail facility in accordance with some embodiments. In some embodiments, the system 800 may include a plurality of modules 802, a Batching Microservice 804, and/or the ClubIQ process 616. In some embodiments, the plurality of modules 802 may include one or more modules in the system 600 of FIG. 6. In some embodiments, the Batching Microservice 804 may check if an item or a corresponding product did not receive any additional payloads from the IRAS Payload process 708 for a particular period of time (e.g., 1 minute, two minutes, and/or any particular interval suitable to determine if items for sale supported on a surface 310 are being depleted). In some embodiments, the Batching Microservice 804 may check for any additional payloads for each item for sale in a retail facility. In some embodiments, the ClubIQ process 616 may include receiving an output of the Batching Microservice 804. In some embodiments, the ClubIQ process 616 may include transmitting forecast information to (e.g., ClubIQ Forecast 610) and/or receiving one or more outputs from the control circuit 102, the AOFS process 702, and/or the POOS process 704 before sending them to the user interface 106.

Figure 10:
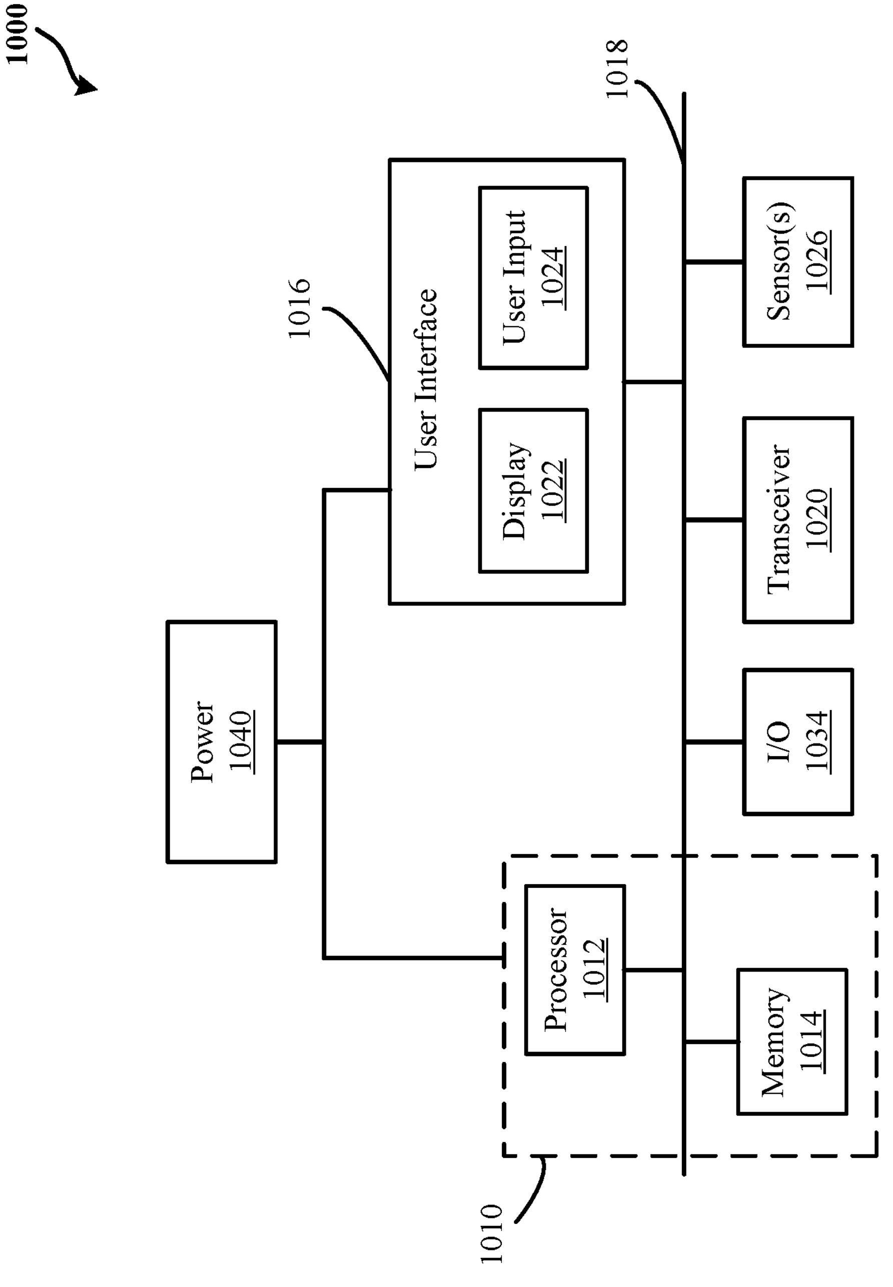
FIG. 10 illustrates an exemplary system for use in implementing methods, techniques, devices, apparatuses, systems, servers, sources and assessing items for sale at a retail facility, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 10 illustrates an exemplary system 1000 that may be used for implementing any of the components, circuits, circuitry, systems, functionality, apparatuses, processes, or devices of the system 100 of FIG. 1, the method 200 of FIG. 2, the system 600 of FIG. 6, the flow diagram 700 of FIG. 7, the system 800 of FIG. 8, and/or other above or below mentioned systems or devices, or parts of such circuits, circuitry, functionality, systems, apparatuses, processes, or devices. For example, the system 1000 may be used to implement some or all of the system for assessing items for sale at a retail facility, the control circuit 102, the imaging device/s 110, the communication network 118, the motorized robotic image capture device 112, the fixed camera 114, the database/s 116, the electronic device/s 104, the user interface 106, the display 108, and/or other such components, circuitry, functionality and/or devices. However, the use of the system 1000 or any portion thereof is certainly not required.

By way of example, the system 1000 may comprise a processor module (or a control circuit) 1012, memory 1014, and one or more communication links, paths, buses or the like 1018. Some embodiments may include one or more user interfaces 1016, and/or one or more internal and/or external power sources or supplies 1040. The control circuit 1012 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1012 can be part of control circuitry and/or a control system 1010, which may be implemented through one or more processors with access to one or more memory 1014 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1000 may be used to implement one or more of the above or below, or parts of, components, circuits, systems, processes and the like. For example, the system 1000 may implement the system for assessing items for sale at a retail facility with the control circuit 102 being the control circuit 1012.

The user interface 1016 can allow a user to interact with the system 1000 and receive information through the system. In some instances, the user interface 1016 includes a display 1022 and/or one or more user inputs 1024, such as buttons, touch screen, track ball, keyboard, mouse, etc., which can be part of or wired or wirelessly coupled with the system 1000. Typically, the system 1000 further includes one or more communication interfaces, ports, transceivers 1020 and the like allowing the system 1000 to communicate over a communication bus, a distributed computer and/or communication network (e.g., a local area network (LAN), the Internet, wide area network (WAN), etc.), communication link 1018, other networks or communication channels with other devices and/or other such communications or combination of two or more of such communication methods. Further the transceiver 1020 can be configured for wired, wireless, optical, fiber optical cable, satellite, or other such communication configurations or combinations of two or more of such communications. Some embodiments include one or more input/output (I/O) interface 1034 that allow one or more devices to couple with the system 1000. The I/O interface can be substantially any relevant port or combinations of ports, such as but not limited to USB, Ethernet, or other such ports. The I/O interface 1034 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 1026 to provide information to the system and/or sensor information that is communicated to another component, such as the control circuit 102, the imaging device/s 110, the communication network 118, the motorized robotic image capture device 112, the fixed camera 114, the database/s 116, the electronic device/s 104, the user interface 106, the display 108, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 1000 comprises an example of a control and/or processor-based system with the control circuit 1012. Again, the control circuit 1012 can be implemented through one or more processors, controllers, central processing units, logic, software and the like. Further, in some implementations the control circuit 1012 may provide multiprocessor functionality.

The memory 1014, which can be accessed by the control circuit 1012, typically includes one or more processor readable and/or computer readable media accessed by at least the control circuit 1012, and can include volatile and/or nonvolatile media, such as RAM, ROM, EEPROM, flash memory and/or other memory technology. Further, the memory 1014 is shown as internal to the control system 1010; however, the memory 1014 can be internal, external or a combination of internal and external memory. Similarly, some or all of the memory 1014 can be internal, external or a combination of internal and external memory of the control circuit 1012. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 1014 can store code, software, executables, scripts, data, content, lists, programming, programs, log or history data, user information, customer information, product information, and the like. While FIG. 10 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for assessing items for sale at a retail facility, the system comprising:

an imaging device configured to capture an image of an item for sale at the retail facility;

a database storing data corresponding to the item for sale at the retail facility, wherein the data comprises item dimensions for the item for sale and surface dimensions of surfaces that support and display the item for sale at the retail facility; and a control circuit coupled to the database and configured to:

receive a captured image of the item for sale, the item for sale positioned on a surface at a location in the retail facility accessible by customers where the customers can collect the items for purchase, wherein the captured image includes a bounding box indicating the item for sale;

receive, for the item in the captured image, an identification of the item for sale associated with each bounding box;

determine, using a reference object with fixed dimensions visible in the captured image, a pixel-to-dimension mapping ratio;

map the item dimensions for the item for sale to pixels associated with each bounding box in the captured image using the pixel-to-dimension mapping ratio;

determine, using at least a pixel count associated with each bounding box and corresponding surface dimensions of the surface, a volume estimate corresponding to the item for sale supported on the surface, wherein determining the volume estimate comprises:

determining an area of aggregated bounding boxes in the captured image based on the pixel-to-dimension mapping ratio of the item dimensions to the pixels;

determining an orientation of the surface based on the area of the aggregated bounding boxes; and calculating the volume estimate based on the area of the aggregated bounding boxes, the orientation of the surface, and the corresponding surface dimensions of the surface; and determine, based on at least the volume estimate and the item dimensions, a quantity of the item for sale supported on the surface.

2. The system of claim 1, wherein the volume estimate comprises an estimate of a total volume of the items for sale supported on the surface.

3. The system of claim 1, wherein the control circuit is further configured to:

determine an area of aggregated bounding boxes in the captured image based on the pixel-to-dimension mapping ratio of the item dimensions for each identified item for sale to the pixels associated with each bounding box; and determine an orientation of the surface based on the area of the aggregated bounding boxes, wherein a determination of the volume estimate is based on the area of the aggregated bounding boxes, the orientation of the surface, and the corresponding surface dimensions of the surface.

4. The system of claim 1, wherein the imaging device comprises a motorized robotic image capture device.

5. The system of claim 1, wherein the surface comprises at least one of a pallet or a shelf.

6. The system of claim 1, wherein the item dimensions comprises a width, a height, and a length.

7. The system of claim 1, wherein the control circuit is further configured to determine the items the item for sale comprises a stack of products having a number of layers, wherein the number of layers of the stack of products is based on the area of aggregated bounding boxes in the captured image and the item dimensions of the item.

8. The system of claim 1, wherein the control circuit is further configured to determine a fill value associated with the surface based at least on the quantity of the item for sale supported on the surface.

9. The system of claim 1, further comprising a user interface operable on an electronic device associated with a worker at the retail facility, the user interface configured to display a message comprising at least one of an instruction to the worker to restock the surface and an estimated run out time of the item based on the determined quantity of the item for sale supported on the surface.

10. The system of claim 9, wherein the control circuit is further configured to determine the estimated run out time of the item; and prioritize transmission of the message based on a plurality of estimated run out time determined for the items for sale at the retail facility.

11. A method for assessing items for sale at a retail facility, the method comprising:

receiving, by a control circuit coupled to a database storing data corresponding to an item for sale at a retail facility, a captured image of the item for sale, the captured image captured by an imaging device, the item for sale positioned on a surface at a location in the retail facility accessible by customers and where the customers can collect the items for purchase, wherein the captured image includes a bounding box indicating the item for sale;

receiving by the control circuit for the item in the captured image, an identification of the item for sale associated with each bounding box;

determining, using a reference object with fixed dimensions visible in the captured image, a pixel-to-dimension mapping ratio;

mapping, by the control circuit, item dimensions for the item for sale to pixels associated with each bounding box in the captured image using the pixel-to-dimension mapping ratio;

determining, by the control circuit and using at least a pixel count associated with each bounding box and corresponding surface dimensions of the surface, a volume estimate corresponding to the items the item for sale supported on the surface, wherein determining the volume estimate comprises:

determining an area of aggregated bounding boxes in the captured image based on the pixel-to-dimension mapping ratio of the item dimensions to the pixels;

determining an orientation of the surface based on the area of the aggregated bounding boxes; and calculating the volume estimate based on the area of the aggregated bounding boxes, the orientation of the surface, and the corresponding surface dimensions of the surface; and determining, by the control circuit and based on at least the volume estimate and the item dimensions, a quantity of the item for sale supported on the surface.

12. The method of claim 11, wherein the volume estimate comprises an estimate of a total volume of the items for sale supported on the surface.

13. The method of claim 11, further comprising:

determining, by the control circuit, the area of aggregated bounding boxes in the captured image based on the pixel-to-dimension mapping ratio of the item dimensions for each identified item for sale to the pixels associated with each bounding box; and determining, by the control circuit, an orientation of the surface based on the area of the aggregated bounding boxes, wherein a determination of the volume estimate is based on the area of the aggregated bounding boxes, the orientation of the surface, and the corresponding surface dimensions of the surface.

14. The method of claim 11, wherein the imaging device comprises a motorized robotic image capture device.

15. The method of claim 11, wherein the surface comprises at least one of a pallet or a shelf.

16. The method of claim 11, wherein the item dimensions comprises a width, a height, and a length.

17. The method of claim 11, further comprising determining, by the control circuit, the item for sale comprising a stack of products having a number of layers, wherein the number of layers of the stack of products is based the area of aggregated bounding boxes in the captured image and the item dimensions of the item.

18. The method of claim 11, further comprising determining, by the control circuit, a fill value associated with the surface based at least on the quantity of the item for sale supported on the surface.

19. The method of claim 11, further comprising displaying, by a user interface operable on an electronic device associated with a worker at the retail facility, a message comprising at least one of an instruction to the worker to restock the surface and an estimated run out time of the item based on the determined quantity of the item for sale supported on the surface.

20. The method of claim 19, further comprising determining, by the control circuit, the estimated run out time of the item; and prioritizing transmission of the message based on a plurality of estimated run out time determined for the items for sale at the retail facility.

* * * * *